(12) United States Patent
Voegele

(10) Patent No.: US 8,497,129 B2
(45) Date of Patent: Jul. 30, 2013

(54) REPROCESSING INDICATORS FOR MEDICAL INSTRUMENTS

(75) Inventor: Aaron C. Voegele, Loveland, OH (US)

(73) Assignee: Ethicon Endo-Surgery, Inc., Cincinnati, OH (US)

( * ) Notice: Subject to any disclaimer, the term of this patent is extended or adjusted under 35 U.S.C. 154(b) by 1803 days.

(21) Appl. No.: 11/377,656

(22) Filed: Mar. 17, 2006

(65) Prior Publication Data

US 2007/0215001 A1    Sep. 20, 2007

(51) Int. Cl.
*G01N 31/00* (2006.01)

(52) U.S. Cl.
USPC ................... 436/1; 604/110; 604/111

(58) Field of Classification Search
USPC ...................... 436/1; 604/110, 111
See application file for complete search history.

(56) References Cited

U.S. PATENT DOCUMENTS

| | | | | |
|---|---|---|---|---|
| 4,478,658 A * | 10/1984 | Wittwer | ............... | 156/69 |
| 4,834,706 A * | 5/1989 | Beck et al. | ............... | 604/111 |
| 5,289,963 A * | 3/1994 | McGarry et al. | ............... | 227/175.1 |
| 5,405,328 A * | 4/1995 | Vidal et al. | ............... | 604/158 |
| 5,467,911 A * | 11/1995 | Tsuruta et al. | ............... | 227/175.1 |
| 5,520,041 A * | 5/1996 | Haswell | ............... | 73/29.04 |
| 6,800,124 B2 * | 10/2004 | Puntambekar | ............... | 106/31.32 |
| 7,244,252 B2 * | 7/2007 | Berndt | ............... | 606/1 |
| 2003/0167070 A1 * | 9/2003 | McEwen et al. | ............... | 606/203 |
| 2006/0054525 A1 * | 3/2006 | Dean et al. | ............... | 206/459.1 |

OTHER PUBLICATIONS

"The Vanguard Process", Vanguard Medical Concepts, Inc., http://www.safe-reuse.com/infokit/vandguardprocess.html, Apr. 25, 2006, 2 pgs.

* cited by examiner

*Primary Examiner* — Krishnan S Menon
*Assistant Examiner* — Dwan A Gerido

(57) ABSTRACT

A medical instrument including a body member and an indicator component. The indicator component includes a mechanism for identifying when reprocessing of the medical instrument has occurred.

8 Claims, 4 Drawing Sheets

REPROCESSING INDICATORS FOR MEDICAL INSTRUMENTS

BACKGROUND OF THE INVENTION

1. Field of the Invention

The invention relates to various indicators for identifying reprocessed medical instruments. More particularly, the invention relates to reprocessing indicators composed of ethylene oxide (EtO) indicator ink and/or non-critical, breakable components of the medical instruments.

2. Description of the Prior Art

Engineers specializing in the design and manufacture of medical instruments commonly attempt to improve upon previously existing medical instruments by enhancing the usage of these instruments. By improving the medical instrument, the possibility for user error is often drastically reduced. Through improved engineering, these engineers attempt to eliminate the gap between the best surgeon and the worst surgeon through careful product design. Similarly, they try to transform patient care through inventive product design. Many of their medical instruments are designed for minimally invasive procedures, resulting in quicker surgeries, lower risk of complications, less pain, shorter recovery time and lower costs.

The development of improved manufacturing techniques, advanced materials and concerns regarding contamination have led to the development of medical instruments designed for single use applications. For example, many laparoscopic devices, such as surgical staplers and trocars, are designed as single use items that are intended to be immediately disposed of after use.

A recent trend in the medical community is reprocessing of single use medical instruments, by parties other than the original equipment manufacturer, instead of discarding them after use. During reprocessing, the medical instruments are disassembled, cleaned and sterilized. They are then reassembled for future use.

However, many of the medical instruments reprocessed for further use are specifically designed only for use during a single procedure. Consequently, the performance of the medical instruments decline after reprocessing, since the components making up the medical instrument are not adapted for multiple uses and will degrade in performance when used beyond their intended lifespan. For example, reprocessing of the cutting devices on trocars extends these devices beyond their intended mission life and may result in duller blades. A greater force, therefore, is needed to make an initial incision, causing more trauma to the patient. In addition, the use of greater force increases the potential for error during the surgical procedure.

The reprocessing itself can also cause serious problems. Some of the components of single use medical instruments cannot be reused. Thus, the reprocessor must manufacture these components. The third party reprocessors often do not satisfy the tolerances required for proper operation of the medical instruments as the third party reprocessors do not have the in depth knowledge of the device application or design required to create proper replacement parts.

As reprocessing of medical instruments proliferates, it has become very difficult to identify if an item has in fact been reprocessed or if it is the original medical instrument delivered by the original manufacturer. Doctors usually do not even know if a medical instrument has been reprocessed, since the medical instrument is commonly unpacked prior to use by the doctor and any reprocessing notification is located on the packaging of the medical instrument. The FDA requires labeling of only the package of the reprocessed item with the new manufacturer information; the medical instrument itself is not required to be marked. In fact, some hospitals instruct the staff responsible for opening medical instruments and setting up the medical instruments for surgery not to inform the doctor as to whether the medical instruments have been reprocessed.

Often, when these medical instruments have been reprocessed and used for a second, third or fourth time, they fail and are returned to the original product manufacturer, for example, assignee Ethicon Endo Surgery, Inc., of the present invention. The original manufacturers are commonly obligated to replace defective products (i.e., those original medical instruments which are defective and have not been reprocessed). However, there is no economical way to distinguish between a product that failed as a result of some defect in the original manufacture thereof and one that failed because of third party reprocessing.

In 2004, the FDA changed some of the regulations relating to third party reprocessing. The FDA rescinded third party re-processors 510(k). This heavily restricts the types of tools that a reprocessor can reprocess. While this is good for original equipment manufacturers, there is a good chance the third party reprocessors will either find a way around the current restrictions or that the 510(k) will be reinstated. In fact, the 510(k)s for one party has been reinstated as of April 2005.

SUMMARY OF THE INVENTION

It is, therefore, an object of the present invention to provide a medical instrument including a body member and an indicator component. The indicator component includes a mechanism for identifying when reprocessing of the medical instrument has occurred.

It is also an object of the present invention to provide a medical instrument wherein the body member is that of a surgical stapler.

It is another object of the present invention to provide a medical instrument wherein the body member is that of a trocar.

It is a further object of the present invention to provide a medical instrument wherein the indicator component is an ink which is reactive with ethylene oxide gas so as to change the appearance of the ink.

It is also another object of the present invention to provide a medical instrument wherein the ink changes color when exposed to ethylene oxide gas.

It is a further object of the present invention to provide a medical instrument wherein the ink is a water-based ink.

It is also an object of the present invention to provide a medical instrument wherein the ink is pad printed upon the body member.

It is yet another object of the present invention to provide a medical instrument wherein the body member is formed from polymers and the ink is mixed in with polymers forming the body member.

It is still another object of the present invention to provide a medical instrument wherein the indicator component is a non-critical, breakable component which is necessarily broken during reprocessing.

It is yet a further object of the present invention to provide a medical instrument wherein the breakable component is positioned along a seam of the body member.

It is also an object of the present invention to provide a medical instrument wherein the breakable component is a polycarbonate resin.

It is another object of the present invention to provide a medical instrument wherein the breakable component is rectangular with recesses formed on opposite sides thereof.

It is a further object of the present invention to provide a medical instrument wherein the recesses are semi-circular recesses.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1A:
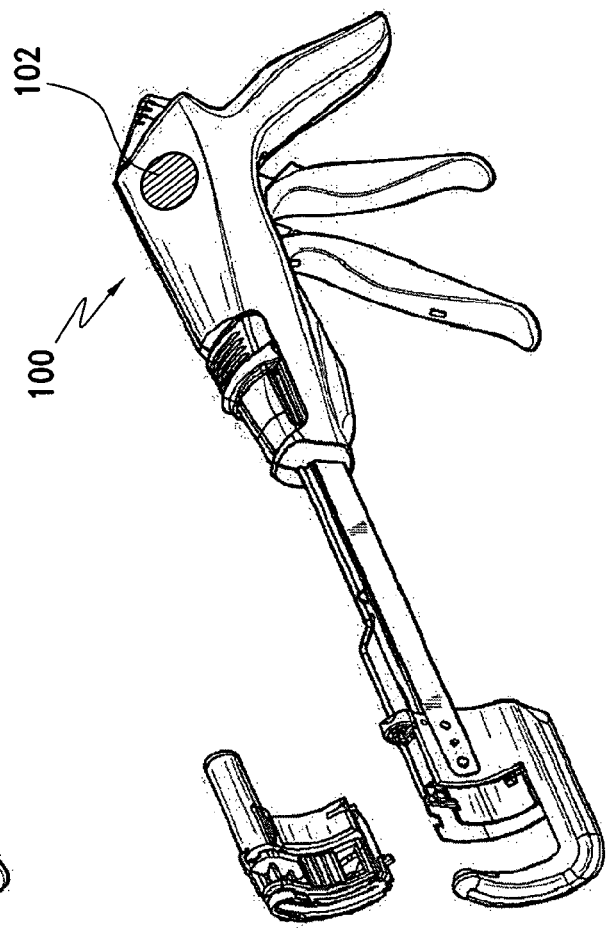
FIGS. 1a and 1b are perspective views of a surgical stapler in accordance with the present invention showing the stapler with the reactive ink unactivated and activated.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for teaching one skilled in the art how to make and/or use the invention.

Since it is necessary to understand the underlying techniques currently employed in reprocessing medical instruments to gain a complete understanding of the present invention, the following presents an overview of the techniques currently employed in the reprocessing of medical instruments. Reprocessing generally relates to the preparation of medical instruments for further use. In particular, the preparation is commonly applied to single use medical instruments and involves two major steps. The first step is the cleaning stage and involves the removal of any foreign material from an item during reprocessing. The second step is sterilization and involves killing any living material, namely, any bacteria or viruses, which could potentially contaminate a medical instrument.

With regard to the cleaning stage, its primary purpose is to remove all biomass or other foreign material on a single use medical instrument. Enzyme detergents and ultrasonic cleaning methods are employed by the reprocessing industry to remove all biomass or other foreign materials. Orthozime® and Endozime® are two enzyme detergents frequently used by reprocessing companies. Ruhof, the company that manufactures Orthozime® and Endozime®, claims these products can eliminate biomass in as little as two minutes.

As those skilled in the art will certainly appreciate, some tools are too complex to clean using ultrasonic methods alone. As such, additional steps are often required to clean internal surfaces or features with limited exposure of the medical instruments. One such item is a trocar. When trocars are cleaned, the cleaning solution must be routed inside the various components of the trocar.

Although the cleaning stage of the reprocessing is focused on removal of material, it also serves to sanitize the items. However, a separate step is required to ensure complete sanitization. The sanitizing stage is employed to disinfect and sterilize single use medical instruments. At the current time, ethylene oxide gas (EtO) sterilization is the sole method employed during the sanitizing stage by those working within the medical instrument reprocessing industry.

Many single use medical instruments include bodies made from polymers, and these materials may be damaged when exposed to the elevated temperatures of high temperature sterilization. The reprocessors are very much aware of this potential problem and cold sterilization is, therefore, a preferred technique utilized in the sanitizing stage. The most common cold sterilization technique employed within the industry is EtO sterilization. Although no national standard is present for EtO sterilization, temperatures generally do not surpass 60° Celsius. This temperature is low enough that it will not damage the single use medical items.

Regardless of the reprocessing indicator technique employed in accordance with the present invention, it must fulfill certain criteria. In particular, the indicator technique must be applicable to a variety of single use medical instruments, which vary in function, shape and size. The presence and location of the indicator should be known only to trained employees of the original manufacturer such that the original manufacturer may readily identify these items when they are returned based upon failures. In accordance with a preferred embodiment, it is contemplated neither the hospital staff nor administration should be aware of the indicator. The indicator should also be readily discernable to all hospital medical staff where such identification is desired. As medical instruments are commonly subjected to gamma radiation, the indication method must be immune to gamma radiation and the indicator must be safe to any person in contact with the medical instrument during any part of the device's life. Further, the indicator should not surpass a critical level of biomass and the indicator must be cost effective.

In accordance with a first embodiment, an inspectable chemical indicator is applied to medical instruments during manufacture and prior to initial use. In this embodiment, the chemical indicator ink that is reactive with EtO is applied to the medical instrument. The indicator ink can be applied to the instrument by either printing on or mixing with the polymers forming the body of a medical instrument. In accordance with the preferred embodiment, the indicator ink will change color in the presence of EtO. By examining the medical instrument to determine whether the EtO indicator ink has changed color, employees may conclude whether a device has been subjected to EtO sterilization and thus reprocessed. A variety of commercially available inks are known.

Figure 1B:
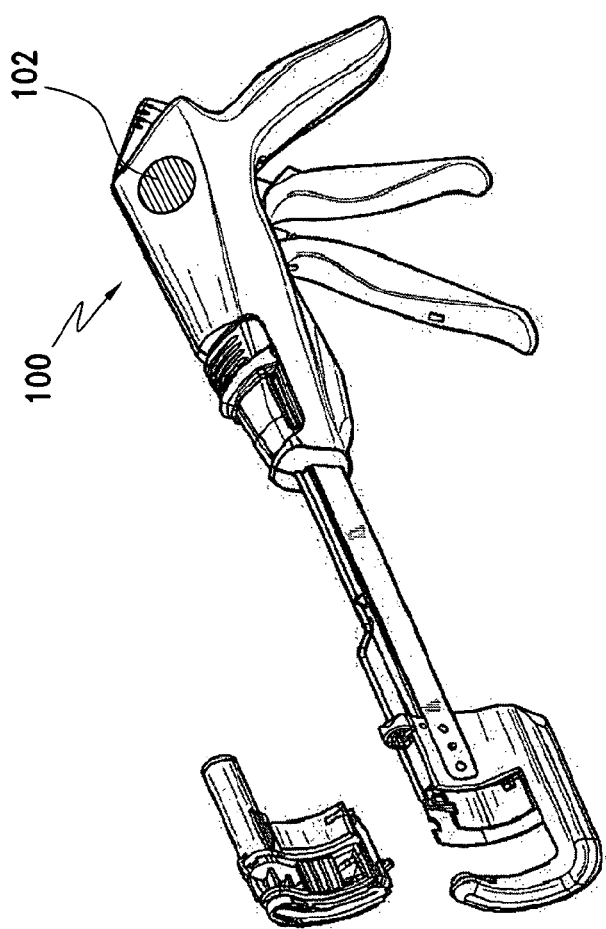
Figure 2A:
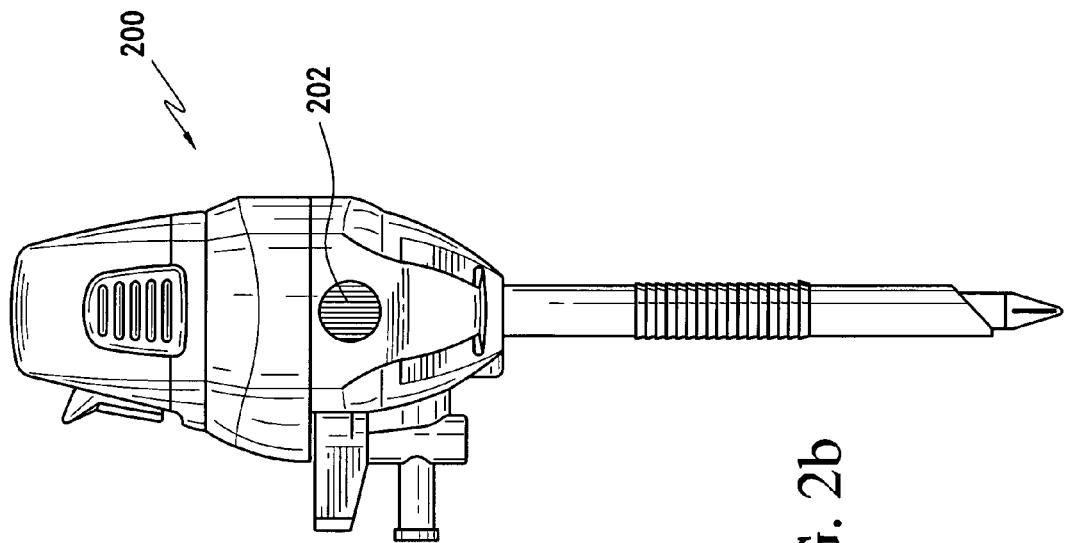
FIGS. 2a and 2b are perspective views of a trocar in accordance with the present invention showing the trocar with the reactive ink unactivated and activated.
Figure 2B:
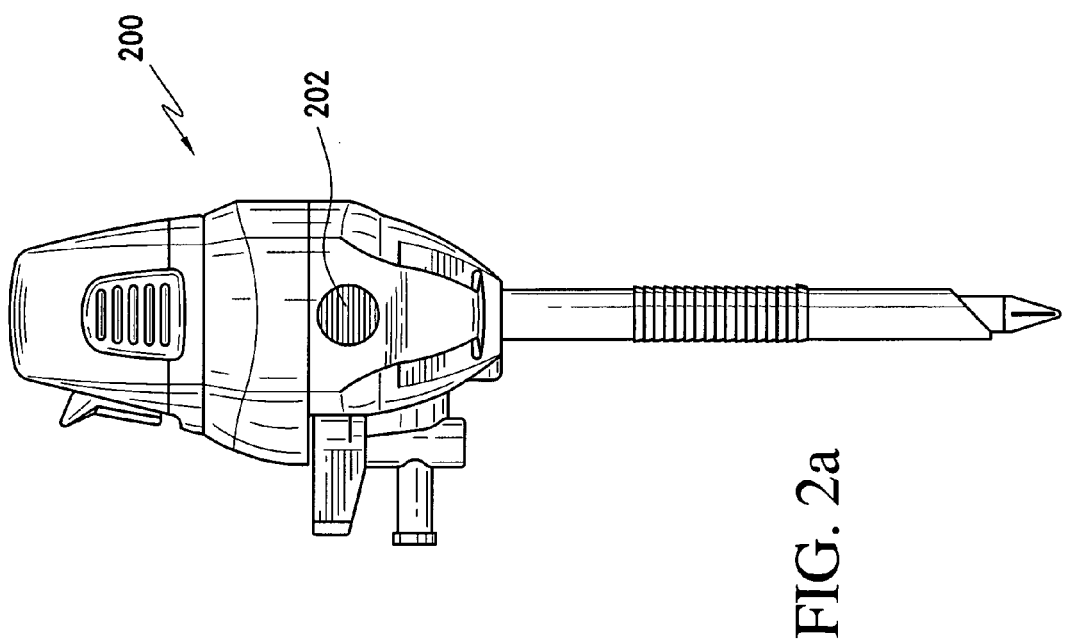

These indicating techniques are shown respectively in FIGS. 1a & 1b, 2a & 2b and 3a & 3b where a surgical stapler and trocar are shown before and after reprocessing. As shown in FIG. 1a, the surgical stapler 100 shows no indication of reprocessing at the inked location 102. However, and as shown in FIG. 1b, the ink changes color in the presence of EtO during reprocessing to provide a specific indication that reprocessing has occurred. Similarly, and as shown in FIG. 2a, the trocar 200 shows no indication of reprocessing at the inked location 202. However, and as shown in FIG. 2b, the ink changes color in the presence of EtO during reprocessing to provide a specific indication that reprocessing has occurred.

Figure 3A:
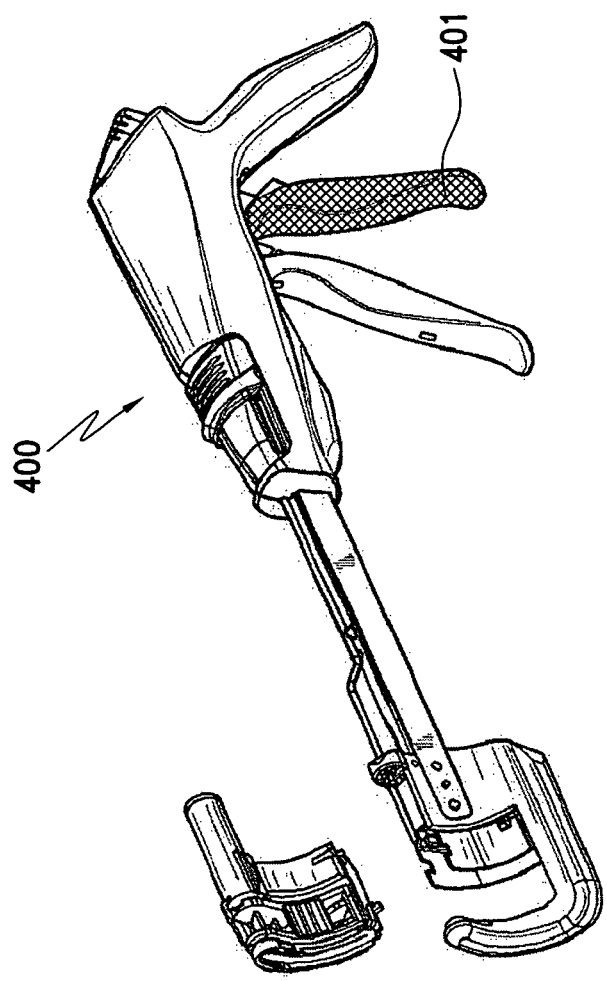
FIGS. 3a and 3b are perspective views of a surgical stapler in accordance with the present invention showing the stapler handle with the reactive ink incorporated therein, unactivated and activated.
Figure 3B:
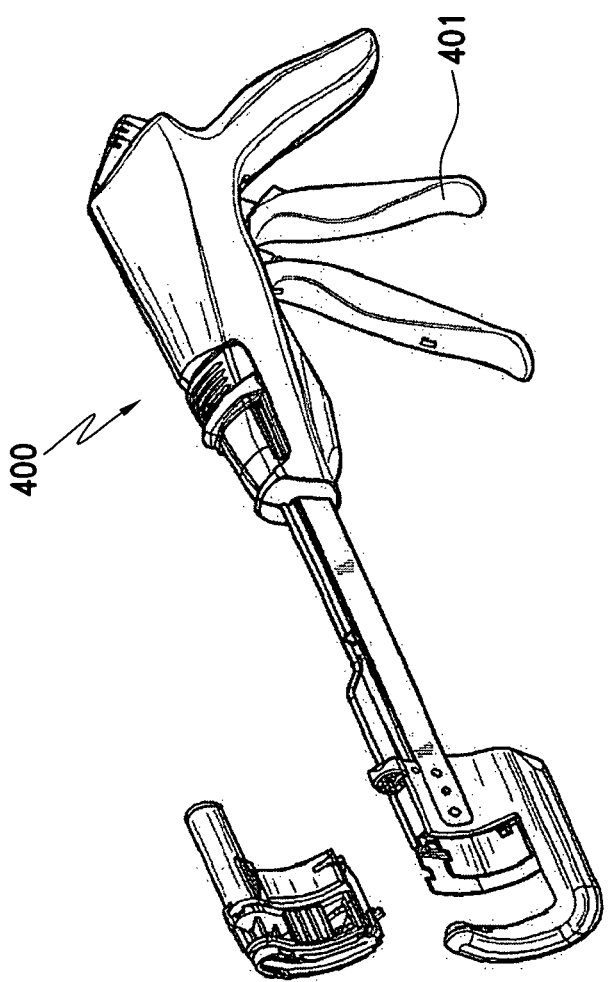

Similarly, and as shown in FIG. 3a, the surgical stapler 400 shows no indication of reprocessing at the location of handle 401 forming part of the body member of the instrument. However, and as shown in FIG. 3b, the ink in handle 401 changes color in the presence of EtO during reprocessing to provide a specific indication that reprocessing has occurred.

For example, 3M manufactures adhesive strips that change color in the presence of EtO. In addition, Tempil also manufactures an ink that reacts with EtO, radiation, steam autoclave sterilization and other similar processes. These inks are intended for a flexographic printing and therefore, could be applied directly to the surface of the medical instrument. If flexographic printing were to be utilized, a separate label containing the indicating ink would not need to be created as the label could be printed directly on the medical instrument.

A company called Namsa (North American Science Associates, Inc.) manufactures a water-based ink that is reactive with EtO. The Namsa ink is yellow before exposure to EtO and turns blue upon exposure to EtO. It has been found that the Namsa EtO indicator ink may be pad printed, although it must be thickened before it may be used in this manner. Pad printing is preferable to flexographic printing because this technique is currently utilized within the medical instrument industry and new techniques for printing would not need to be incorporated.

As those skilled in the art will certainly appreciate, pad printing is an "indirect offset gravure" printing process. The image to be printed is created on the printing plate, normally produced by chemical etching. The plate is generally steel or a nylon photopolymer material. Pad printing inks contain solvents. The evaporation of the solvents from the ink is the main mechanism that enables the process to operate. When the ink is contained within the etched image area, this evaporation of solvents causes the surface of the ink to become tacky. The shape of the pad is such that when it compresses on the plate the printing surface of the pad rolls across the plate, as it does so it comes into contact with the tacky surface of the ink. The ink sticks to the pad, as the pad lifts the printing surface rolls away from the plate and lifts up ink from the etching. While the pad moves towards the object to be printed, the solvent continues to evaporate from the ink on the pad and the outside surface of the ink becomes tacky. As the pad makes contact with the object and compresses, the print surface of the pad rolls across the object and the tacky surface of the ink attaches itself to the surface of the object. The pad then lifts and the printing surface of the pad rolls away from the surface of the object and releases the ink leaving it laying on the surface. While this is happening the etched portion of the plate is recharged with ink, and the pad returns to pick up another image from the plate.

As such, those inks permitting pad printing are preferred in accordance with a preferred embodiment of the present invention. The EtO indicator ink is pad printed onto the medical instrument body in the form of a word or a shape. As a result, when the part to be reprocessed undergoes EtO sterilization during the reprocessing process, the word or shape will change color. A trained employee may then note the color change to determine if the medical instrument has been reprocessed. In accordance with a preferred embodiment, yellow indicator ink is printed over common yellow pad printing in a predetermined shape. On the original use only the predetermined shape can be seen as both the indicator ink and the box are yellow, but when exposed to the EtO, the indicator ink changes color and exposes a word or indicative shape. This is best done when wanting to inform the end users.

This technique offers many advantages in that it provides a clear indication that the medical instrument has been reprocessed, offers easy integration into the manufacturing line because the process can be easily automated and is highly adaptable for a variety of parts.

As those skilled in the art will certainly appreciate, the indicator ink may be positioned at a discrete position on the instrument readily discernable by those inspecting the device, but not readily obvious to those reprocessing the device. The EtO indicator ink relies upon an industry standard for terminal sterilization and, therefore, any tools that are reprocessed would undoubtedly be exposed to EtO and would, therefore, activate the ink. Terminal sterilization is the process of sterilizing the final packaged product. In contrast, an aseptic packaging process requires individual product components to be sterilized separately and the final package assembled in a sterile environment. Terminal sterilization of a product provides greater assurance of sterility than an aseptic process. In general, the ability to use a terminal sterilization method can reduce various manufacturing costs for products when compared to an aseptic manufacturing process.

Although indicator inks reactive with EtO are being discussed herein, those skilled in the art will appreciate other sanitizing techniques are employed within the reprocessing industry and, as such, various indicator inks may be employed without departing from the spirit of the present invention.

In accordance with a further embodiment of the present invention, the indicator may take the form of an inspectable, non-critical breakable component. In accordance with this invention, a thin piece of material is placed and secured over a seam of a single use medical instrument. The seam preferably occurs at a point where two components of the single use medical instrument are attached and would necessarily be separated during reprocessing. Therefore, when the pieces are separated, the material that spanned the joint will break allowing a trained individual to readily recognize whether the material was broken and the device was reprocessed.

In order that the material not catch on anything or interfere with a surgical process, it is preferably placed within a recess on the inner or outer surface of the medical instrument. It is contemplated that several different materials could be utilized in accordance with this embodiment, for example, a small piece of plastic, a piece of wire or even a thin metal strip could be utilized in conjunction with this embodiment.

Figure 5:
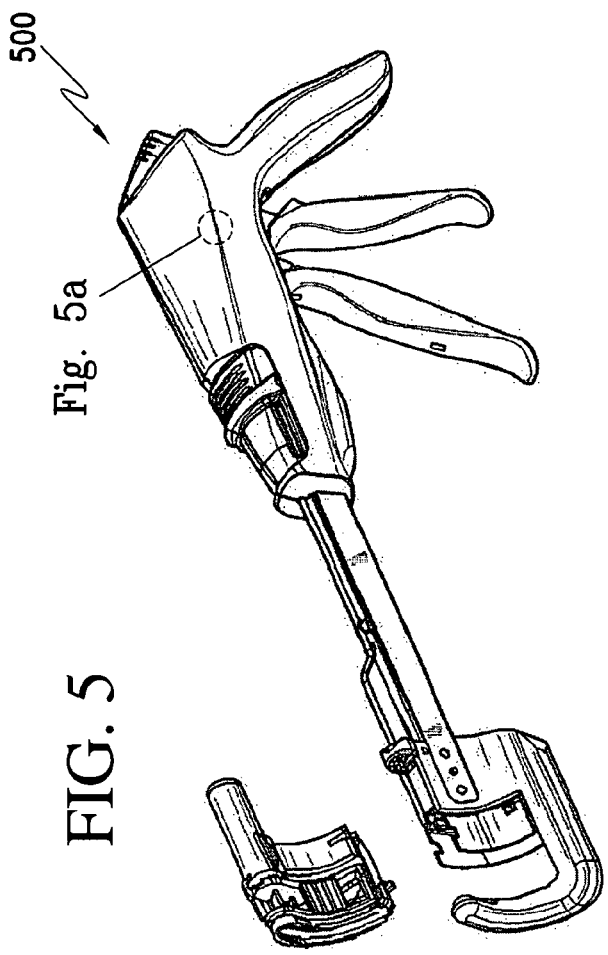
FIGS. 5 and 5a are respectively a perspective view and detailed view of a surgical stapler including a breakable component in accordance with the present invention.
Figure 5A:
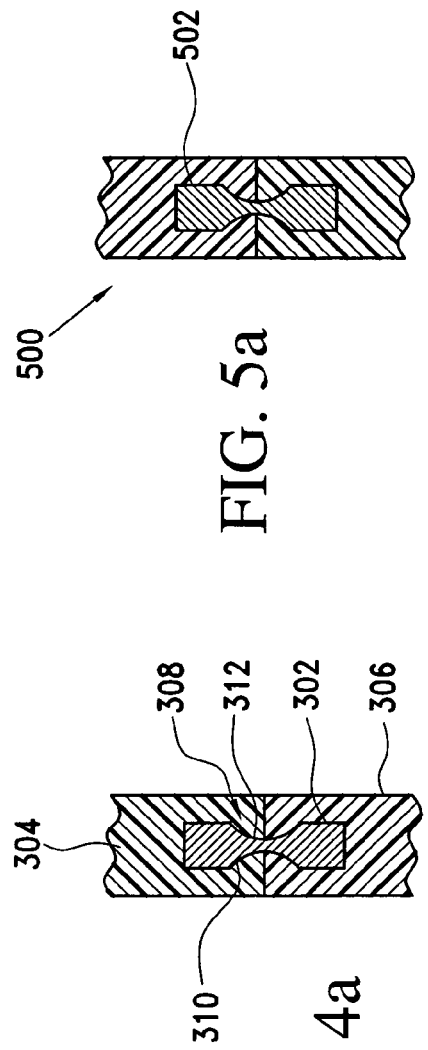
Figure 4:
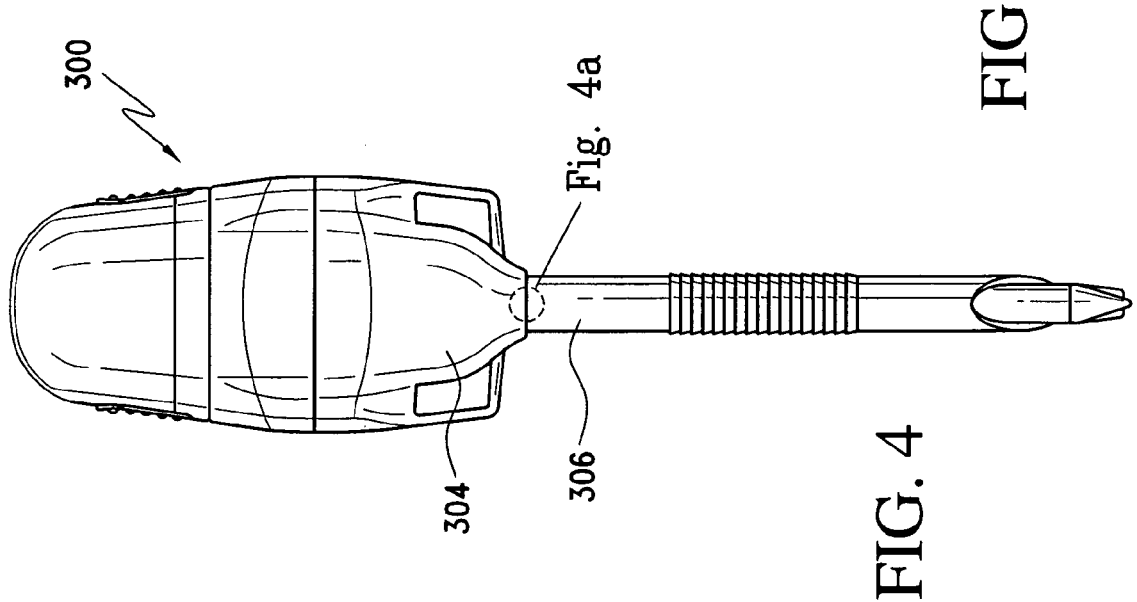
FIGS. 4 and 4a are respectively a perspective view and detailed view of a trocar including a breakable component in accordance with the present invention.
Figure 4A:
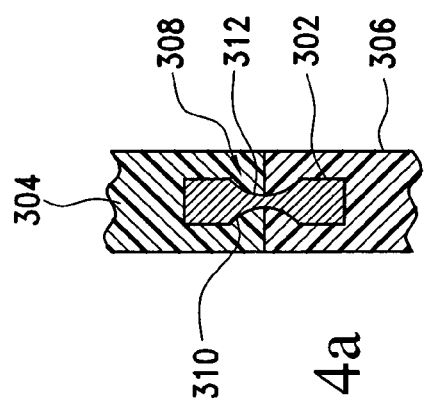

In accordance with a preferred embodiment, and with reference to FIGS. 4 and 4a, the non-critical, breakable component indicator concept is applied to a trocar 300. Those skilled in the art will appreciate that although the concepts underlying the invention are applied to a trocar in accordance with a preferred embodiment of the present invention, the concepts of the present invention may be applied to a variety of medical instruments (for example, a surgical stapler 500 with a breakable component 502 as shown in FIGS. 5 and 5a) without departing from the spirit of the present invention.

In accordance with this application, a breakable component 302 made of Dow Polycarbonate Resin Calibre 2061-15 is positioned to span two parts 304, 306 of the trocar 300. Although a specific material is disclosed in accordance with a preferred embodiment, other similar materials could be used without departing from the spirit of the present invention.

It is contemplated the polycarbonate resin could be applied to the seam in the trocar using a variety of manufacturing techniques. For example, the polycarbonate resin is a thermoplastic and could, therefore, be heated, melted and formed any number of times. The breakable component could, therefore, be adhered to the single use medical instrument by utilizing this property. Alternatively, a heat source could be used to melt the ends of the component to the body of the single use medical instrument (that may also be manufactured from the polycarbonate resin).

In accordance with a preferred embodiment of the present invention, the breakable component 302 is substantially rectangular with a central area 308 having semi-circular recesses 310, 312 on both sides thereof. The recesses 310, 312 are positioned at a mid-point along the length of the breakable component 302. The semi-circular recesses 310, 312 are positioned where the reprocessing technician must break apart the medical instrument before cleaning it.

The component is designed to induce a stress concentration factor under dynamic loading, that is, when the technician breaks apart the medical instrument, and break when a predetermined stress level is reached. As such, an employee of the original manufacturer will be able to readily discern whether the medical instrument has been reprocessed by identifying the broken component. The preferred material is the polycarbonate resin, although other materials may certainly be used without departing from the spirit of the present invention. This plastic was chosen because it has been proven to be safe for surgical use, it is already utilized in conjunction with medical instruments and could be easily welded to the substantive components of the medical instrument.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A medical instrument, comprising:
a body member;
an indicator component, the indicator component is a non-critical, breakable component for identifying when reprocessing of the medical instrument has occurred, the non-critical, breakable component being necessarily broken during reprocessing and the breakable component is positioned along a seam of the body member within recesses formed along opposed surfaces of the medical instrument.

2. The medical instrument according to claim 1, wherein the body member is that of a surgical stapler.

3. The medical instrument according to claim 1, wherein the body member is that of a trocar.

4. The medical instrument according to claim 1, wherein the breakable component is a polycarbonate resin.

5. The medical instrument according to claim 4, wherein the body member is that of a surgical stapler.

6. The medical instrument according to claim 4, wherein the body member is that of a trocar.

7. The medical instrument according to claim 1, wherein the breakable component is rectangular with recesses formed on opposite sides thereof.

8. The medical instrument according to claim 7, wherein the recesses are semi-circular recesses.

* * * * *